Jan. 18, 1938.　　　A. S. CAMPBELL　　　2,106,130
VERTICAL BUMPER
Filed Nov. 10, 1936
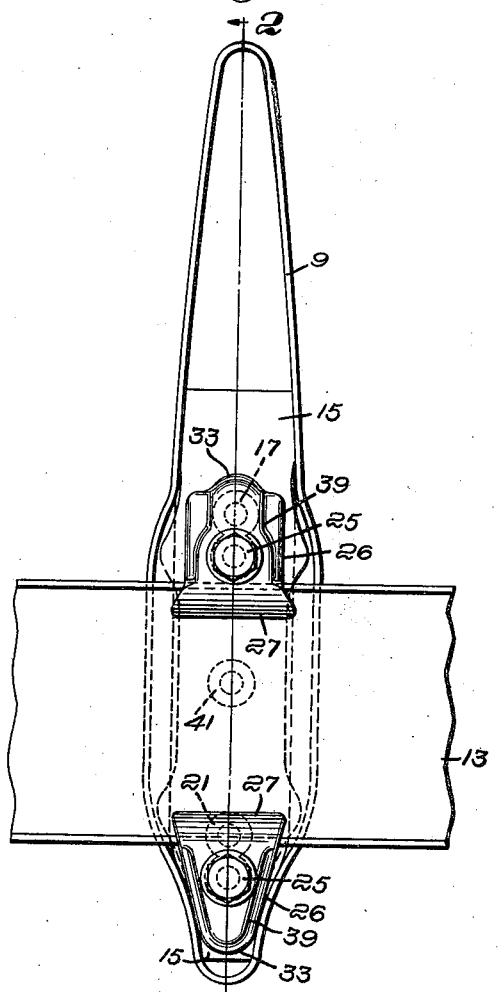
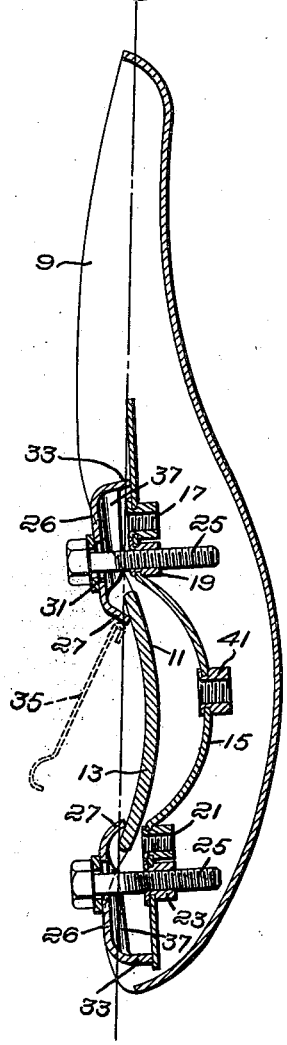
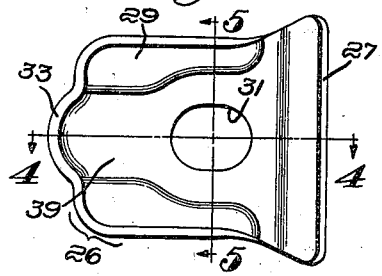
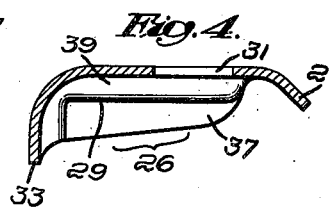
Inventor:
Alphonso S. Campbell,
by Emery, Booth, Townsend, Miller & Weidner
Attys Patented Jan. 18, 1938

2,106,130

UNITED STATES PATENT OFFICE 2,106,130

VERTICAL BUMPER

Alphonso S. Campbell, Winchester, Mass., assignor to A. S. Campbell Co., Inc., East Boston, Mass., a corporation of Massachusetts Application November 10, 1936, Serial No. 110,048

4 Claims. (Cl. 293—55)

The ordinary bumper utilized on automobiles, whether in one or several parts, consists essentially of a horizontally disposed bar of limited vertical dimension extending across the width of the vehicle. Since automobiles differ in height and since even in vehicles of the same kind the elevation of the bumper above the road will vary in accordance with the load on the vehicle, considerable inconvenience and damage is caused by a bumper of one car passing above or below another or interlocking therewith. It has therefore become common to attach to the bumper bar vertical cross pieces providing a surface of considerable height or depth to engage the bumper of another car and prevent such action. Such devices have been variously termed "bumper guards", "grille protectors" and "vertical bumpers". My invention aims to provide a device of this nature having efficient means for attaching the same to the horizontal bumper bar for securing it in position under widely varying conditions arising from the different constructions of such bumper bars and, in the preferred form herein shown, providing for an adjustment of the angular position of the vertical bumper to harmonize with the adjacent lines of the vehicle.

My invention will be well understood by reference to the following description taken in connection with the accompanying drawing, wherein:—

Fig. 1 is a rear elevation of the device in position on the horizontal bumper bar, a fragment only of which latter is shown;

Fig. 2 is a central vertical section therethrough on line 2—2 of Fig. 1;

Fig. 3 is a plan of an attaching clip on an enlarged scale, viewing the side opposite that appearing in Fig. 1; and Figs. 4 and 5 are sections on lines 4—4 and 5—5 of Fig. 3, respectively.

Referring to the embodiment of the invention shown in the drawing, the vertical bumper there shown comprises a main body consisting of a hollow sheet metal stamping having a preferably imperforate front face and a rearwardly extending marginal portion 9. The general shape of the device may be widely varied subject to aesthetic rather than mechanical considerations. The rear edges of the marginal portion 9 are formed with a curved seat 11 adapted to be positioned by movement of superposition from the front against the horizontal bumper bar 13, herein illustrated as of the single bar type.

A common method utilized for securing devices of this nature has been to bolt them to a washer plate extending across the inner side of the horizontal bumper. Certain types of bumpers present in certain locations obstructions which prevent attachment in this manner. Moreover, when so attached, the vertical bumper attachment is secured in a fixed angular position, say vertically plumb, which may be entirely out of harmony with the lines of the vehicle to which it is applied. As will appear from the following description, I here provide a construction obviating these disadvantages.

Welded within the hollow body is a securing plate 15 disposed forwardly of the seat 9 and extending beyond the same. At either end the plate carries a series of threaded elements, herein sleeves or nuts, two, 17 and 19, being shown at the upper end and two, 21 and 23, at the lower end. Clamping bolts 25 engaging these nuts pass through securing clips 26 which have hooked or rolled edges 27 to engage behind the marginal edges only of the bar 13, shanks 29 provided with vertically elongated openings 31 to pass the bolts and forwardly projecting portions 33 at their relatively distal ends adapted to engage the rear face of plate 15. The clips, when acted on by the clamping bolt act as levers of the second class. It will be apparent that by this construction the vertical bumper attachment is firmly secured in place and this independently of any obstruction at the rear of the horizontal bar 13. Thus in Fig. 2, I have indicated in dotted lines a so-called gravel skirt 35. It will be seen that the presence of such a device in no way interferes with the secure positioning of the bumper attachments.

The provision of a plurality of nuts at either end of the seat not only provides for attachment of the device to the bumper bars of different width, but permits in the case of many constructions of such bars a variation in angular position. Thus if the bolts 25 were engaged with the nuts 19 and 21 or with the nuts 17 and 23, the attachment would be held in substantially vertical position. If, however, the seat 11 is rotated somewhat on the front face of the bar 13 and the upper bolt is engaged in nut 19 and the lower bolt in the non-symmetrically placed nut 23, the attachment will be secured in position with a rearward rake, as shown in the drawing, whereas if the asymmetrically placed nuts 17 and 21 were utilized, a forward rake would be provided for. The hooks which are in engagement with the edges of the bumper bar are of a pivoting nature, permitting the different applications shown and adjustment of the degree thereof, which is also facilitated by the elongated form of the openings 31 providing for freedom of vertical adjustment between the shanks of the bolts and the clips.

It is clear that a shock against an end of the vertical bumper attachment places a strain upon the clips tending to open the hooks. A preferred form of clip is most clearly illustrated by the larger views, Figs. 3, 4 and 5, showing the upper clip, the lower clip being similar although, as shown, of different form to adapt it to its situation. The clips shown are formed of sheet metal having the hooked or rolled edge 27. The broad shank 29 has a forwardly facing marginal flange 37 and is struck upwardly between its side edges to form a rib 39 which extends from the throat of the hook (see Fig. 4) and supports the same. The outer surface of the rib may merge at the end away from the hook with the flange 37 which at the end opposite from the hook is extended in a transversely curved form to provide the portion 33 which bears against the plate 15. This construction gives a light but very stiff clip.

Referring to Fig. 2 of the drawing, I have there shown the plate 15 as also provided with a central nut 41 permitting the device to be secured in position by a single central clamping bolt under conditions where this is possible and desirable.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:

1. A vertical bumper comprising a body having a seat at its rear side to be applied by a movement of superposition from the front to a horizontal bumper bar, a nut and a bolt at either side of the seat, one of which is secured to the body to dispose the shank of the bolt projecting rearwardly therefrom across the upper and lower vertical edges of the bar, clips through which the bolts pass having ends extending over the margin of the horizontal bar, including a clip having a hooked edge to engage said margin, a broad shank extending therefrom having a marginal flange and a rib struck up centrally therefrom through which the bolt-receiving opening is formed and which extends substantially from the throat of the hook.

2. A vertical bumper comprising a body having a seat at its rear side to be applied by a movement of superposition from the front to a horizontal bumper bar, a nut and a bolt at either side of the seat, one of which is secured to the body to dispose the shank of the bolt projecting rearwardly therefrom across the upper and lower vertical edges of the bar, clips through which the bolts pass having ends extending over the margin of the horizontal bar, including a clip having a hooked edge to engage said margin, a broad shank extending therefrom having a marginal flange and a rib struck up centrally therefrom through which the bolt-receiving opening is formed and which extends substantially from the throat of the hook, the flange at the end away from the hook being transversely curved as an extension or base for the rib and prolonged inwardly in the direction in which the hook faces.

3. A vertical bumper comprising a body having a seat at its rear side to be applied by a movement of superposition from the front to a horizontal bumper bar, a nut and a bolt at either side of the seat, one of which is secured to the body to dispose the shank of the bolt projecting rearwardly therefrom across the upper and lower vertical edges of the bar, sheet metal clips comprising a marginal hooked or rolled edge to engage over the margin of the horizontal bar, a broad shank pierced to pass the bolts and a flange encircling the shank transversely curved at the end away from the hook and prolonged inwardly in the direction in which the hook faces.

4. A vertical bumper comprising a body having a seat at its rear side to be applied by a movement of superposition from the front to a horizontal bumper bar, a nut and a bolt at either side of the seat, one of which is secured to the body to dispose the shank of the bolt projecting rearwardly therefrom across the upper and lower vertical edges of the bar, sheet metal clips comprising a marginal hooked or rolled edge to engage over the margin of the horizontal bar, a broad shank pierced to pass the bolts and a flange encircling the shank transversely curved at the end away from the hook and prolonged inwardly in the direction in which the hook faces, the shanks being struck up centrally to provide a reinforcing rib merging with the hook substantially at the throat thereof.

ALPHONSO S. CAMPBELL.